United States Patent [19]

Canino

[11] 4,006,294
[45] Feb. 1, 1977

[54] TRANSDUCER HEAD ASSEMBLY WITH FLUID BEARING AND HEAD HEIGHT CONTROL SYSTEM

[75] Inventor: Lawrence S. Canino, Redondo Beach, Calif.

[73] Assignee: MCA Disco-Vision, Inc., Universal City, Calif.

[22] Filed: May 27, 1975

[21] Appl. No.: 580,749

[52] U.S. Cl. .................. 358/127; 179/100.3 V; 360/103; 358/128
[51] Int. Cl.² .................. G11B 7/12; G11B 21/20
[58] Field of Search .......... 178/6.6 R, 6.6 A, 6.7 A, 178/6.6 DD; 179/100.3 V, 100.41 L; 360/103, 102, 75

[56] References Cited

UNITED STATES PATENTS

| 3,123,677 | 3/1964 | Lauxen | 360/103 |
| 3,132,328 | 5/1964 | Taylor | 360/103 |
| 3,829,622 | 8/1974 | Elliott | 179/100.3 V |
| 3,894,180 | 7/1975 | Canino | 179/100.3 V |
| 3,914,541 | 10/1975 | Elliott | 178/6.6 R |

Primary Examiner—Bernard Konick
Assistant Examiner—Alan Faber
Attorney, Agent, or Firm—Kleinberg, Morganstern, Scholnick & Mann

[57] ABSTRACT

A transducer head assembly supported above a surface has the spacing of its transducer head from the surface maintained at a predetermined value by a pressure-sensitive regulator which responds to changes in fluid flow pressure resulting from spacing changes to correct variations from the predetermined spacing. The assembly includes a pair of expandable chambers which are coupled to each other through a fluid restrictor and which carry the transducer head, the expandable chambers being sensitive to pressure changes and causing the transducer head to move toward and away from the surface in response to such changes to correct the fluid flow pressure.

13 Claims, 4 Drawing Figures

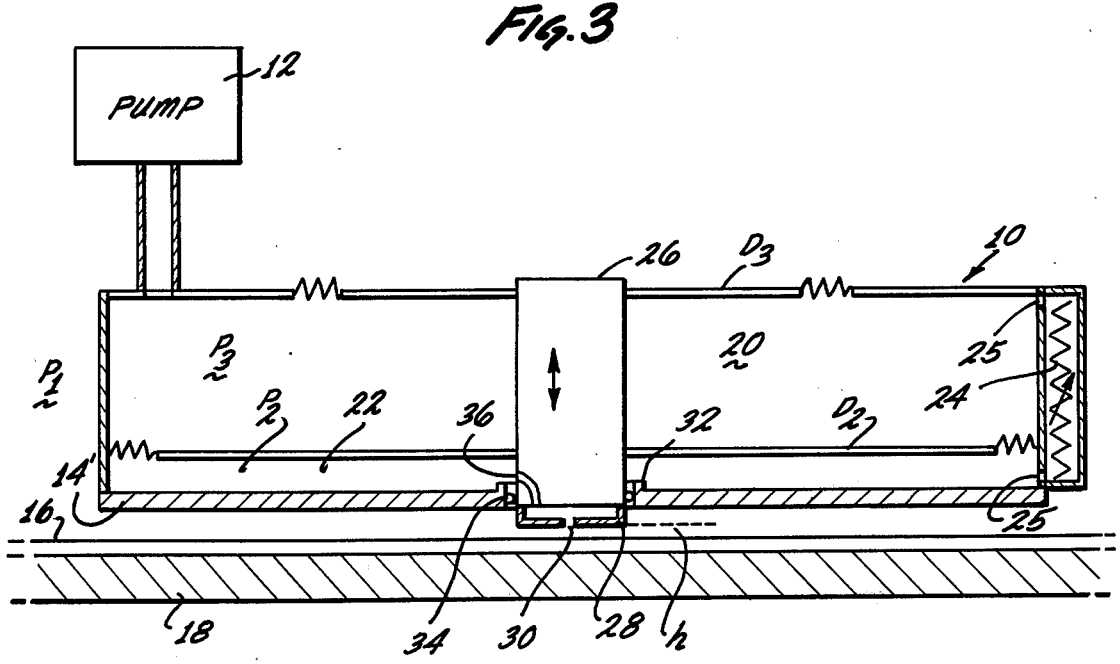
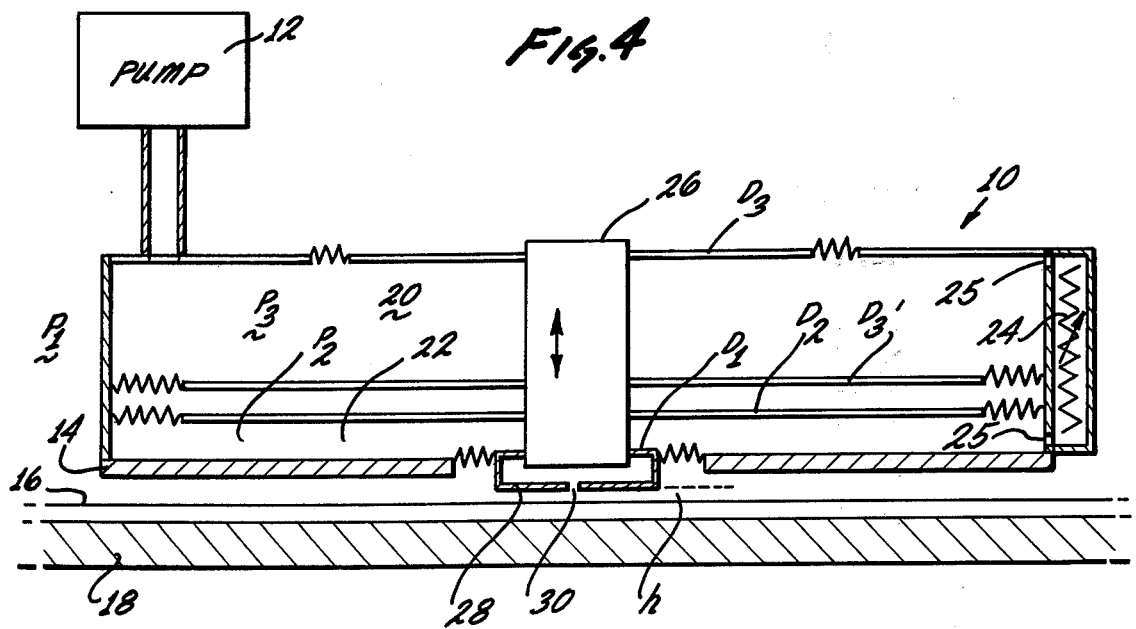

TRANSDUCER HEAD ASSEMBLY WITH FLUID BEARING AND HEAD HEIGHT CONTROL SYSTEM

CROSS-REFERENCES TO RELATED PATENTS

"Video Disc Player" by James E. Elliott, U.S. Pat. No. 3,914,541 issued Oct. 21, 1975; "Head Height Control System" by Lawrence S. Canino, U.S. Pat. No. 3,894,180 issued July 8, 1975.

BACKGROUND OF THE INVENTION

1. Field of the Invention

The present invention relates to a fluid pressure servo system and, more particularly, to a system designed to maintain a constant spacing as between a member and a surface, separated by a hydrodynamic fluid.

2. Description of the Prior Art

In the development of a video disc system, information is recorded on a disc as a series of irregularities, each approximately 1 micron in width, arranged in a line with adjacent lines or tracks being spaced apart by approximately 2 microns center to center. As noted in the above-identified Elliott application, the problem of optically resolving irregularities of these dimensions requires that the focus of the optical system be maintained constant to within a micron.

One method of maintaining a constant disc-to-head spacing which could be adapted to optical reading of a video disc is described in U.S. Pat. No. 3,132,328, issued May 5, 1964 to M. K. Taylor, entitled "Reading and Writing Head Mounting Means". In this patent, a double bellows arrangement is used in conjunction with a control nozzle to keep the head to disc spacing constant. The control nozzle blows air against the disc and causes a predetermined nozzle pressure. If the nozzle pressure increases because the head is too close, the pressure causes a control bellows connected thereto to enlarge and to push against a compensating bellows which is maintained at a constant line pressure to force the head away from the disc. If the nozzle pressure decreases because the head is too far away, however, the pressure in the control bellows is not decreased but rather the compensating bellows exerts a force greater than the force exerted by the control bellows and forces the head closer to the disc. The above arrangement, however, has the disadvantage that it requires a constant line pressure since the compensating bellows must exert a precise force on the control bellows and must be in equilibrium with the control bellows at a predetermined head-to-disc spacing.

As described in the above-identified Canino application, another method of reading the information recorded on a disc is through the use of a transducer head assembly placed adjacent the disc and which, along with the disc, is immersed in a fluid thus creating a hydrodynamic fluid bearing between the assembly and the disc. As is further described in the Canino application, the spacing maintained between the assembly and the disc can be kept substantially constant by means of a source of fluid at a variable controllable pressure and a pressure regulator including a fluid flow restrictor which responds to changes in separation between the assembly and the disc and modifies the fluid pressure applied to the head. In the Canino application, however, the head assembly and the pressure regulator are two separate structures and the resultant combination does not lend itself readily to miniaturization, a feature greatly desirable in present day video equipment. In addition the pressure regulator includes a valving arrangement for varying the fluid pressure which could further complicate an attempt at miniaturizing and combining the two separated structures.

SUMMARY OF THE INVENTION

According to the present invention, a novel transducer head assembly has been discovered which embodies certain of the principles described in the Canino application and yet which allows for an internal construction of both the head assembly and the pressure regulator. The assembly includes a first chamber coupled to a source of fluid and a second chamber coupled to the first chamber by a variable restrictor that is adjusted to exhibit the same resistance to fluid flow as the head-disc combination itself. The second chamber communicates with the fluid in the spacing between the assembly and the disc. The first and second chambers, while fixedly mounted, have movable surfaces and carry a transducer head which can move relative to the disc and which can act to vary the fluid flow between the head assembly and the disc in response to changes in spacing between the transducer head and the disc so as to maintain such spacing at a reasonably constant value.

The novel features which are believed to be characteristic of the invention, both as to organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

BRIEF DESCRIPTION OF THE DRAWINGS

FIG. 3 is a cross-sectional view of a modified form of the invention illustrated in FIG. 1;

FIG. 4 is a cross-sectional view of a second modified form of the invention illustrated in FIG. 1.

DESCRIPTION OF THE PREFERRED EMBODIMENT

Figure 1:
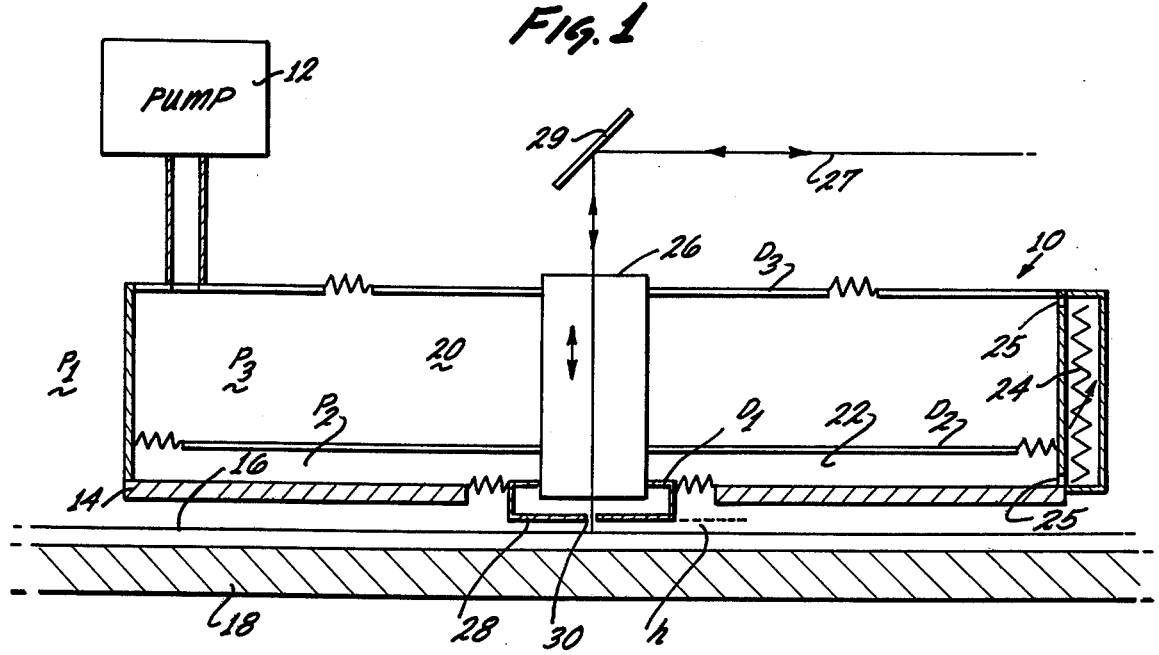
FIG. 1 is a cross-sectional view of a preferred embodiment of the invention.

Turning now to the FIG. 1, there is shown in cross-section a cylindrically symmetrical transducer head assembly 10 and a fluid (such as air) source 12, in this embodiment a positive pressure pump. The assembly 10 is fixedly mounted by plate 14 relative to a flexible disc 16 which may rotate with a back plate turntable 18. While it is preferred that the pump pressure be kept constant, it is not necessary to maintain the pump pressure at any precise level and such pressure may vary, with the system automatically responding to compensate for such variation.

The assembly 10 includes a first chamber 20 coupled to the pump 12 and a second chamber 22 coupled to said chamber 20 through a variable restrictor 24, by means of apertures 25, which controls the flow of fluid between the two chambers. A transducer head 26 is carried by the assembly 10 by means of movable diaphragms $D_3$, $D_2$ and $D_1$ and is capable of upwards and downwards motion. The transducer head 26, in this embodiment, acts as a focusing lens for a low powered laser beam 27 which reflects off a mirror 29 and then off of the surface of the disc 16. The information contained in the surface irregularities of the disc causes changes in the angle or intensity of the beam representative of such information. Attached to transducer head 26 and diaphragm $D_1$, which has one or more apertures therein (not shown) to allow the passage of fluid therethrough, is a plate 28 having a small aperture 30 therein opposite the disc 16.

For the purposes of explanation, it will be assumed that the outside ambient pressure is considered to be $P_1$, the pressure within chamber 22 to be $P_2$ and the pressure within chamber 20 created by pump 12 to be $P_3$, with $P_3 > P_2 > P_1$. In addition, the area of diaphragms $D_3$, $D_2$ and $D_1$ can be represented by areas $A_3$, $A_2$ and $A_1$, respectively, with $A_2 > A_3 > A_1$. As such, the total forces acting on the diaphragms $D_3$, $D_2$ and $D_1$ is:

$$F_t = (P_3 - P_1)A_3 - (P_3 - P_2)A_2 - (P_2 - P_1)A_1 \quad \text{Equation (1)}$$

If the resistance of restrictor 24 is $R_1$ and is adjusted to have a similar flow resistance characteristic as the transducer head 26, the flow Q through the restrictor 24 can be expressed by:

$$Q = \frac{P_3 - P_2}{R_1}, P_3 - P_2 = QR_1 \quad \text{Equation (2)}$$

It then follows that:

$$F_t = R_1 Q(A_3 - A_2) + (P_2 - P_1)(A_3 - A_1) \quad \text{Equation (3)}$$

If the head height is to be kept constant, the sum of the forces on the transducer head 26 must be able to be kept equal to zero. In this condition:

$$\frac{Q}{P_2 - P_1} = \frac{A_3 - A_1}{R_1(A_2 - A_3)} \quad \text{Equation (4)}$$

Since:

$$Q = \frac{h^3(P_2 - P_1)}{K\mu} \quad \text{Equation (5)}$$

where $h$ is the distance of the plate 28 from the disc 16, K is a constant and $\mu$ is the viscosity of fluid (air), it is evident that the head height can be maintained constant under the present assembly construction by keeping $Q/P_2 - P_1$ a constant, i.e. by regulating the flow rate through the aperture 30 in plate 28. From equation (5), it is seen that the flow resistance characteristics of the transducer head 26 is determined essentially by the spacing $h$ the viscosity $\mu$ and the constant K which is dependent on the configuration of the aperture 30.

Since the flow Q varies as the third power of the height $h$ small changes in head to disc spacing are accompanied by substantial changes in pressure $P_2$ and flow Q. These changes are corrected, however, in the present invention by the motion of the transducer head 26. That is, if the pressure $P_2$ increases because $h$ has decreased, a corresponding increase is caused in pressure $P_3$ through the restrictor 24 causing a net upward motion of the diaphragms and an upward motion of the transducer head 26. This upwards motion would increase the flow of fluid through the aperture 30 causing the head spacing $h$ to increase and the pressure $P_2$ to decrease until an equilibrium value is reached.

Similarly, if the pressure $P_2$ decreases because $h$ has increased, a corresponding decrease is caused in pressure $P_3$ through the restrictor 24 causing a net downward motion of the diaphragms and a downward motion of the transducer head 26. This downward motion would decrease the flow of fluid through the aperture 30 causing the head spacing to decrease and the pressure $P_2$ to increase until an equilibrium value is reached.

Figure 2:
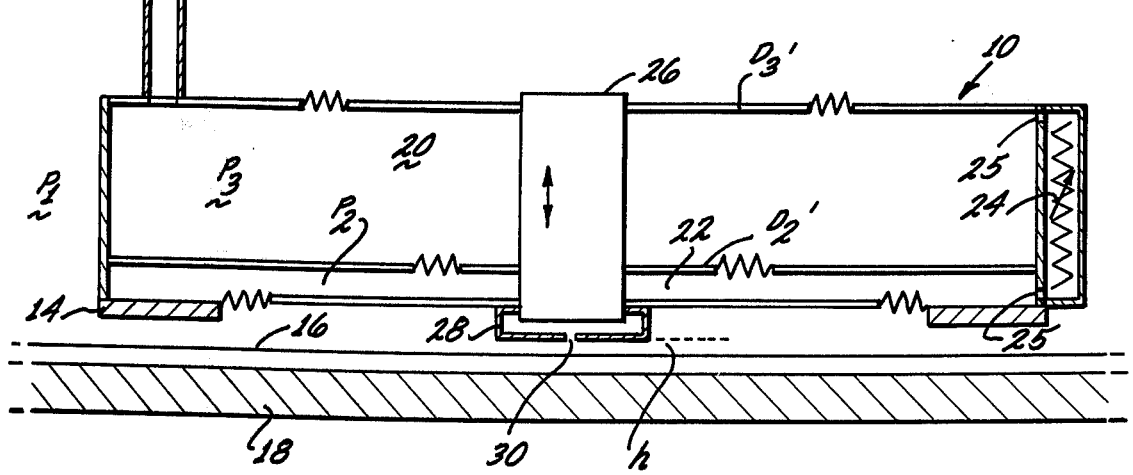
FIG. 2 is a cross-sectional view of a second embodiment of the invention.

In FIG. 2, a second embodiment of the invention is shown in which the pump 12' is now a negative-pressure (vacuum) pump and $P_1 > P_2 > P_3$. In such an embodiment, in order for the head spacing $h$ to be kept constant the areas of the diaphragms $D_3$, $D_2'$ and $D_1'$ have to be changed, as shown, so that $A_1' > A_3 > A_2'$, in order to satisfy the conditions of Equation (4).

In FIG. 3, a modification of the invention shown in FIG. 1 is illustrated in which the diaphragm $D_1$ is eliminated and the plate 14 is extended to form a leakproof slip seal with the plate 28. The plate 14 is shown as having a lip 32 and an "O" ring 34 so that the head 26 can have full travel and still maintain such a fluid tight slip seal. Alternatively, lip 32 could comprise a magnetic ring with a ferrofluid being contained between lip 32 and plate 28 to form a fluid tight slip seal. In this embodiment, the apertures (not shown) formerly in diaphragm $D_1$ are now replaced by a tube 36 connecting chamber 22 and the region between head 26 and plate 28.

As is shown in FIG. 4, the chambers 20 and 22 do not have to have a common diaphragm $D_2$, but may have separated diaphragms such as diaphragm $D_2$ for chamber 22 and diaphragm $D_3'$ for chamber 20. If the fluid between diaphragms $D_2$ and $D_3$ is deemed incompressible then the forces acting on each such diaphragm will promptly be transmitted to the other one. In the event the fluid is not incompressible and very large or rapid forces are expected, it may be advisable to further strengthen the diaphragms $D_2$ and $D_3'$ to reduce flexing or to further mechanically couple diaphragms $D_2$ and $D_3'$, such as by connecting rings, in order to prevent a degradation of the response time of the system.

As is apparent from the above modifications and variations, numerous other variations and modifications will, of course, occur to those skilled in the art without departing from the principles of the present invention. The transducer head 26, for example, may be of the conventional variety and carry an electromagnetic transponder thereon to sense magnetic changes in the disc 16.

Accordingly, the scope of the invention should be limited only by the claims appended hereto.

What is claimed as new is:

1. A fluid servomechanism for controlling the separation between the surface of a moving information-bearing medium and a relatively fixed transducer head used in sensing the information in the medium, said servomechanism and said surface being immersed in an ambient fluid, said fluid servomechanism comprising:

a fixed and rigid housing positionable with an end wall thereof adjacent the surface of the medium, having a first chamber, and having a second chamber located between said first chamber and said end wall;

a first diaphragm forming a portion of said end wall of said housing to establish a sealed movable wall portion separating said second chamber from the ambient fluid;

a second diaphragm substantially parallel to said first diaphragm and separating said first chamber from the ambient fluid;

a third diaphragm located inside said housing between said first and second diaphragms and substantially parallel to them, and between said first and second chambers, each diaphragm being deformable in a direction substantially perpendicular to the surface of the medium;

rigid structural means connecting the deformable portions of said diaphragms constraining them to deform in the same direction by equal displacements, the transducer head being connected to said rigid structural means for movement therewith;

an orifice attached to said first diaphragm for movement therewith, said orifice connecting said second chamber with the ambient fluid adjacent said orifice;

a flow-restricting conduit joining said first chamber and said second chamber, having a flow resistance related in a predetermined way to the flow resistance of said orifice; and, means for connecting a pump directly with said first chamber for forcing fluid to flow in series through said pump, said first chamber, said flow-restricting conduit, said second chamber and said orifice.

2. The fluid servomechanism of claim 1, in which said orifice is located at the center of said first diaphragm intermediate the transducer head and the medium, and the transducer head senses the information in the medium through said orifice.

3. The fluid servomechanism of claim 1, in which said rigid structural means further comprise the transducer head.

4. The fluid servomechanism of claim 3, in which said transducer head is an optical transducer head, operable for channelling a beam of light through said orifice for sensing information stored in the medium.

5. The fluid servomechanism of claim 4, wherein said transducer head further includes a lens system.

6. The fluid servomechanism of claim 1, in which said transducer head is connected to said diaphragms at central regions of each diaphragm.

7. The fluid servomechanism of claim 1, in which said housing further comprises cylindrical sections having a common axis perpendicular to the surface of the medium, and the centers of said diaphragms lie on said common axis.

8. The fluid servomechanism of claim 1, in which the volume of said second chamber is appreciably less than the volume of said first chamber.

9. The fluid servomechanism of claim 1, wherein said pump is operable for supplying fluid to said first chamber at a substantially constant pressure above the pressure of the ambient fluid.

10. The fluid servomechanism of claim 9, in which the area of said second diaphragm is greater than the area of said first diaphragm, and the area of said third diaphragm is greater than the area of said second diaphragm.

11. The fluid servomechanism of claim 1, wherein said pump is operable for evacuating fluid from said first chamber.

12. The fluid servomechanism of claim 11, wherein the area of said first diaphragm is greater than the area of said second diaphragm, and the area of said second diaphragm is greater than the area of said third diaphragm.

13. The fluid servomechanism of claim 1, further comprising a fourth diaphragm adjacent said third diaphragm, parallel to it but spaced apart from it, and further comprising an incompressible fluid filling the space between said third and fourth diaphragms.

* * * * *